United States Patent
Kieser et al.

(10) Patent No.: US 6,417,250 B2
(45) Date of Patent: Jul. 9, 2002

(54) FORMULATIONS

(75) Inventors: Manfred Kieser, Darmstadt; Alfred Hennenmann, Frankfurt, both of (DE)

(73) Assignee: Merck Patent Gesellschaft Mit Beschrankter Haftung (DE)

( * ) Notice: Subject to any disclaimer, the term of this patent is extended or adjusted under 35 U.S.C. 154(b) by 0 days.

(21) Appl. No.: 09/933,111

(22) Filed: Aug. 21, 2001

Related U.S. Application Data

(63) Continuation of application No. 09/597,232, filed on Jun. 20, 2000, now abandoned, which is a continuation of application No. 08/275,485, filed on Jul. 15, 1994, now abandoned.

(30) Foreign Application Priority Data

Jul. 16, 1993 (DE) .......................................... 43 23 914

(51) Int. Cl.$^7$ ................................................ C08K 9/00
(52) U.S. Cl. ..................................................... 523/205
(58) Field of Search .......................................... 523/205

(56) References Cited

U.S. PATENT DOCUMENTS 3,802,913 A * 4/1974 MacKenzie ................. 117/232
4,792,580 A   12/1988 Doshi
4,828,623 A   5/1989  Nitta
5,187,220 A   2/1993  Richart

FOREIGN PATENT DOCUMENTS

JP   0 008 641   1/1979
JP   0 139 770   7/1985

* cited by examiner

*Primary Examiner*—Paul R. Michl
(74) *Attorney, Agent, or Firm*—Millen, White, Zelano & Branigan, P.C.

(57) ABSTRACT

The present invention relates to formulations which essentially comprise a film-former or a casting resin and pearl lustre pigments which are coated with a silane of the formula I $$SiR^1R^2R^3R^4 \quad \text{I.}$$

11 Claims, No Drawings

FORMULATIONS

This is a continuation of U.S. Ser. No. 09/597,232 filed on Jun. 20, 2000 which is a continuation of Ser. No. 08/275,484 filed on Jul. 15, 1994.

The present invention relates to formulations which essentially comprise a film-former or casting resin and a silanized pearl lustre pigment.

In the case of metal effect pigments, in terms of their applications characteristics, there are various types of pigments, namely the so-called leafing and non-leafing types.

Leafing refers to the floating or accumulation and the orientation of pigments at the surface of a coating substance or of a coating. Under the effect of the interfacial tension between pigment and coating composition, the lamellar pigment particles move to the surface of the coating composition where they come together to form a continuous film. The visual impression given is of a closed metallic surface of high reflectivity with a silvery-bright metallic gleam. The phenomenon of leafing has previously only been observed for metal effect pigments.

In the case of pearl lustre pigments based on mica, the only pigments known so far are those with non-leafing properties; in other words, pearl lustre pigments exhibit, in virtually all those areas in which they are used, a non-leafing behaviour, i.e. a good compatibility with the medium surrounding them: the individual pigment particles are completely wetted and distributed in the medium in which they are embedded.

However, in some areas of application, in particular those in which the orientation of pearl lustre pigments is incomplete, such as film-formers, powder coatings and casting resins, a leafing behaviour is very often desirable.

The object was therefore to discover formulations which contain pearl lustre pigment and in which a leafing effect is observed.

It has now been found that, surprisingly, pearl lustre pigments which have been coated with a silane, with the aim of achieving improved compatibility, exhibit a pronounced leafing behaviour in film-formers and casting resins. In the formulation, leafing leads to a significantly improved orientation of the pigments at the surface, resulting in an increased pearl lustre.

The invention therefore relates to formulations essentially comprising a film-former or casting resin, characterized in that they contain pearl lustre pigments which are coated with one or more silanes of the formula I $$SiR^1R^2R^3R^4 \qquad I$$

in which
$R^1$ and/or $R^2$ are alkyl having from 1–30 carbon atoms, in which one or two non-adjacent $CH_2$ groups may also be replaced by —CH=CH—, —O—, —CO—, —COO— or —OCO—, and the remaining radicals $R^{1-4}$ independently of one another are halogen or alkoxy having from 1–20 carbon atoms, in which one or two non-adjacent Cal groups may also be replaced by —CH=CH—, —O—, —CO—, —COO— or —OCO—.

Pigments coated with a silane of the formula I are already known from EP 0,492,223. The pigments it describes are used for inhibiting yellowing in plastics.

This document, however, does not describe the combination of silanized pearl lustre pigment and film-former or casting resin for achieving a leafing effect.

An essential constituent of the formulation according to the invention is the silanized pearl lustre pigment. All conventional pearl lustre pigments can be used as the base pigment, for example mica or silicate flakes coated with coloured or colourless metal oxides such as $TiO_2$, $Fe_2O_3$, $SnO_2$, $Cr_2O_3$, ZnO and other metal oxides, alone or as a mixture in a single layer or in successive layers. These pigments are known from, for example, the German Patents and Patent Applications 14 57 468, 19 59 998, 20 09 566, 22 14 545, 22 15 191, 22 44 298, 23 13 331, 25 22 572, 31 37 808, 31 37 809, 31 51 343, 31 51 354, 31 51 355, 32 11 602 and 32 35 017 and are commercially available, for example under the tradename Iriodine® from E. Merck, Darmstadt.

The silanization of the pearl lustre pigments is carried out as described in EP 0,492,223. The silanized pearl lustre pigments preferably used are pigments, in particular $TiO_2$-coated mica pigments, which are coated with a silane or silane mixture of the formula I $SiR^1R^2R^3R^4$, in which the radicals $R^{1-4}$ have the following meanings:

$R^1$ and/or $R^2$ are alkyl having from 1–30 carbon atoms, and in particular 10–30 carbon atoms, in which one or two non-adjacent $CH_2$ groups may also be replaced by —CH=CH— and/or —O—. Particular preference is given to decyl, undecyl, dodecyl, tridecyl, tetradecyl, pentadecyl, hexadecyl, heptadecyl, octadecyl, nonadecyl, eicosanyl, heneicosanyl, docosanyl, tricosanyl, tetracosanyl, pentacosanyl, hexacosanyl, heptacosanyl, octacosanyl, nonacosanyl, triacontanyl, 12,12-dimethyltetradecyl, 11-propyl-12-butylpentadecyl and 8,8-dimethyl-12-propyl-13-propylhexadecyl radicals.

the remaining radicals $R^{1-4}$ are halogen or alkoxy having from 1–20 carbon atoms, in particular 1–10 carbon atoms, in which one or two non-adjacent $CH_2$ groups may also be replaced by —CH=CH—, —O—, —CO—, —COO— or —OCO—. Particular preference is given to fluoro, chloro, methoxy, ethoxy, propoxy, butoxy, pentyloxy, hexyloxy, heptyloxy, octyloxy, nonyloxy or decyloxy radicals.

The pearl lustre pigments which are particularly preferably used are coated with a silane or silane mixture of the formula IA $$(C_nH_{2n+1})Si(OC_mH_{2m+1})_3 \qquad IA$$

in which n is 1–30 and
m is 1–10. The silane mixture preferably consists of two or three silanes of formula I or IA.

All conventional casting resins, for example gel coats, and film-forming systems are suitable for the formulation according to the invention. The term film-forming system should be understood here as meaning all solvent-containing or else solvent-free binder systems with which it is possible, by physical or chemical methods, for example drying at room temperature or at elevated temperatures of up to about 200° C., polymerization and/or crosslinking induced by chemical means or by radiation, for example TV radiation, and other conventional treatment methods, to form smooth and readily adhering films. It is preferred to use high-solids film-formers, UV- and electron beam-curing film-formers and, in particular, powder coatings.

The production of the formulation is simple and easy to manage. The silanized pearl lustre pigment is stirred, with or without the addition of solvent, into the film-former or into the casting resin and mixed intensively (for example with a modified dissolver). The formulation is then applied (for example by brushing, dipping, spraying or electrostatically) to the substrate material to be coated, so that the substrate surface is fully covered with a. homogeneous film. Finally the coating is fully cured under the conventional conditions. Due to the leafing effect a coating of pronounced pearl lustre is obtained in which the pearl lustre pigment is accumulated at the surface.

The leafing effect, that is the floating of the pearl lustre pigments at the surface of the film-former or the casting resin, and the leafing stability—a leafing effect which is unchanged over a prolonged period in the formulation—depend on the film-forming system and on the casting resin used.

The degree of pigmentation, the viscosity and the curing characteristics of the film-former or casting resin may also influence the leafing effect.

For a good leafing effect, the pigmented formulation should not contain more than 15% by weight of pearl lustre pigments. The pigment content is preferably between 0.3–10% and is in particular from 1–5%, based in each case on the binder or resin.

Over the silanized pigments it is also possible to apply, as a top coat, one or more clearcoats, for example an aqueous coating or powder coating, to improve the surface quality; the aim of this as a rule is to achieve a further improvement in both the appearance and the durability of the overall finish. The transparent final coat, however, is not absolutely necessary.

The formulations according to the invention can be applied to any desired substrate materials, for example metals such as iron, steel, aluminium, copper, bronze, brass and metal foils, or else metal-coated surfaces of glass, ceramic and concrete, and also to wood, for example furniture, or clay, paper, packaging materials, for example plastic containers, or films, boards or other materials for decorative and/or protective purposes. The finishes obtained in every case, due to the leafing effect, are highly lustrous and of enhanced reflectivity. Furthermore, due to the compact platelet structure of the individual pigment particles at the surface, a good mechanical and chemical resistance is achieved.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application(s) German P 43 23 914.5, filed Jul. 16, 1993, are hereby incorporated by reference.

The following examples are intended to illustrate the invention, but without limiting it.

EXAMPLE 1

I. Pigment Preparation

1st Step 3 g of n-hexadecyltriethoxysilane (Si 116 from Degussa AG, Frankfurt, FRG) are stirred with 3 g of $H_2O$ and 50 g of ethanol for 0.5 h at room temperature 2nd Step 150 g of Iriodin 103 ($TiO_2$-coated mica flakes with a particle size of 10–60 µm from E. Merck, Darmstadt, FRG) are placed in a suitable mixer (for example a modified dissolver). The prehydrolysed silane solution (Si 116 solution) is added to the pigment, which is being agitated. Over a period of 1 h, the wetted pigment is heated with stirring to 100° C. Finally the coated pearl lustre pigment is dried for 3 h at 150° C.

II. Comparison of Applications Properties of Leafing and Non-leafing Pigments in a Powder Coating a) Untreated Pearl Lustre Pigment (Non-leafing Type)

5 g of Iriodin 103 are mixed intensively with 95 g of polyester-TGIC powder coating (Teodur 00013 clear, Herberts, Wuppertal, FRG) under dry conditions.

Application is carried out electrostatically onto an aluminium panel. Curing is carried out under the conditions conventional for a powder coating for 20 min at 200° C. The pearl lustre finish obtained does not exhibit leafing. The pigment is uniformly distributed in the matrix.

b) Silanized Pearl Lustre Pigment (Leafing Type)

In analogy to IIa) 5 g of the $TiO_2$ mica pigment obtained under I. are mixed intensively with 95 g of a polyester-TGIC powder coating under dry conditions Application is carried out electrostatically onto an aluminium panel. Curing of the powder coating is carried out as for the untreated pigment, for 20 min at 200° C.

A highly lustrous finish is obtained in which the pigment has floated to the surface. The pigment has accumulated at the surface of the matrix (leafing behaviour).

EXAMPLE 2

I. Pigment Preparation

Pigment preparation is carried out in analogy to Example 1 but employing, instead of Iriodin 103, Iriodin 119 ($TiO_2$-coated mica flakes with a particle size of 5–25 µm).

II. Comparison of Applications Properties of Leafing and Non-leafing Pigments in Unsaturated Polyester Resin a) Untreated Pearl Lustre Pigment (Non-leafing Type) 0.5 g of Iriodin 119 is stirred with 50 g of Palatal K 700 (BASF, Ludwigshafen, FRG) and with 0.2 g of Accelatator NTL 49 S (Akzo Chemicals, Düaren, FRG) for 15 min. 1.0 g of Cyclonox 11 (Akzo Chemicals, Duiren, FRG) is then added and the mixture is stirred for a further 1 min. The mixture is then divided. Using a doctor knife, the first portion is applied to glass at a layer thickness of 1 mm. The second portion is applied to glass using a brush.

Result:

Both samples exhibit a non-uniform distribution. in the case of application by brush, the brush strokes are visible. In the case of application with the doctor knife, "Bénard cells" are visible. A faint pearl lustre can be observed.

b) Silanized Pearl Lustre Pigment (Leafing Type)

In analogy to the experiment carried out above, the pearl lustre pigment silanized in I (Iriodin 119 with silane aftertreatment) is used. The experimental conditions are otherwise unchanged.

Result:

Both samples exhibit a uniform layer of pearl lustre pigments at the surface. Neither brush strokes nor "Bénard cells" are visible. The pearl lustre is very good.

EXAMPLE 3

I. Pigment Preparation

Analogous to Example 2, but methyltriethoxysilane (ABCR, Karlsruhe) is employed instead of n-hexadecyltriethoxysilane.

II. Comparison of Applications Properties of Leafing and Non-leafing Pigments in a UV-curing Clearcoat a) Untreated Pearl Lustre Pigment (Non-leafing Type) 0.5 g of Iriodin 119 is stirred with 50 g of UV clear coat (Jäger, Düsseldorf, FRG) for 15 min. The mixture is then divided. Using a doctor knife, the first portion is applied to glass at a layer thickness of 250 µm. The second portion is applied to glass using a brush. After a waiting time of one minute, both samples are cured using a 300 watt UV lamp.

Result:

Both samples exhibit a non-uniform distribution. In the case of application by brush, the brush strokes are visible. In the case of application with the doctor knife, "Bénard cells" are visible. Only a faint pearl lustre is evident.

b) Silanized pearl lustre pigment (Leafing Type)

In analogy to the experiment carried out above, silanized pearl lustre pigment (Iriodin 119 with silane aftertreatment) is used. Prior to exposure (curing), a waiting time of 1 min is allowed to achieve a leafing effect. The experimental conditions are otherwise retained.

Result:

Both samples exhibit a uniform and highly lustrous layer of pearl lustre pigments at the surface. Neither brush strokes nor "Bénard cells" were visible. The pearl lustre is very good.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A formulation comprising a film-former or casting resin, characterized in that it contains pearl lustre pigments which are coated with one or more silanes of the formula I $$SiR^1R^2R^3R^4 \quad\quad I$$

in which

R$^1$ and/or R$^2$ are alkyl having from 10–30 carbon atoms, in which one or two non-adjacent CH$_2$ groups may also be replaced by —CH=CH—, —O—, —CO—, —COO—, or —OCO—, and the remaining radicals R$^{1-4}$ independently of one another are halogen or alkoxy having from 1–20 carbon atoms, in which one or two non-adjacent CH$_2$ groups may also be replaced by —CH=CH—, —O—, —CO—, —COO—, or —OCO—.

2. A formulation according to claim 1, characterized in that the silane is a compound of the formula IA $$(C_nH_{2n+1})Si(OC_mH_{2m+1})_3, \quad\quad IA$$

in which m is 1–10 and n is 1–30.

3. A formulation according to claim 1, characterized in that the content of pearl lustre pigment in the formulation is from 0.3–15% by weight.

4. A formulation according to claim 1, characterized in that the film-former is a powder coating.

5. A formulation according to claim 1, characterized in that the film-former is a high-solids or a radiation-curing film-former.

6. A formulation according to claim 1, characterized in that the pearl lustre pigment is a mica or silicate flake coated with one or more metal oxides.

7. A formulation according to claim 6, characterized in that the pearl lustre pigment is a mica flake coated with titanium dioxide.

8. A substrate coated with a film-former or casting resin according to claim 1.

9. A formulation according to claim 5, wherein the film-former is a polyester-TGIC powder coating.

10. A formulation according to claim 1, wherein the film-former or casting resin is a coating compound.

11. A formulation comprising a film-former or casting resin, wherein the formulation comprises:

pearl luster pigments, wherein the pigments are leafing pigments, and wherein the pigments are coated with one or more silanes of the formula I $$SiR^1R^2R^3R^4 \quad\quad I$$

wherein,

R$^1$ and/or R$^2$ are alkyl, having from 10–30 carbon atoms, wherein one or two non-adjacent CH$_2$ groups may also be replaced by —CH=CH—, —O—, —CO—, —COO—, or —OCO—, and wherein the remaining radicals R$^{1-4}$ independently of one another are halogen or alkoxy having from 1–20 carbon atoms, wherein one or two non-adjacent CH$_2$ groups may also be replaced by —CH=CH—, —O—, —CO—, —COO—, or —OCO—.

* * * * *